(12) United States Patent
Tsuji et al.

(10) Patent No.: US 9,128,488 B2
(45) Date of Patent: Sep. 8, 2015

(54) MOVEMENT DIRECTION CONTROL APPARATUS AND COMPUTER PROGRAM

(75) Inventors: Shigeru Tsuji, Nagaokakyo (JP); Shigeki Fukunaga, Nagaokakyo (JP); Mitsuhiro Namura, Nagaokakyo (JP); Koji Kawai, Nagaokakyo (JP); Kenichi Shirato, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 73 days.

(21) Appl. No.: 13/232,149

(22) Filed: Sep. 14, 2011

(65) Prior Publication Data

US 2012/0010783 A1 Jan. 12, 2012

Related U.S. Application Data

(63) Continuation of application No. PCT/JP2010/051836, filed on Feb. 9, 2010.

(30) Foreign Application Priority Data

Mar. 16, 2009 (JP) ................................ 2009-062177

(51) Int. Cl.
*G05D 1/02* (2006.01)
*B62K 1/00* (2006.01)
*G05D 1/08* (2006.01)
*A63H 17/25* (2006.01)

(52) U.S. Cl.
CPC ........ *G05D 1/027* (2013.01); *B62K 1/00* (2013.01); *G05D 1/0891* (2013.01); *A63H 17/25* (2013.01)

(58) Field of Classification Search
USPC ............... 701/41–42, 13, 124; 244/164–165
See application file for complete search history.

(56) References Cited

U.S. PATENT DOCUMENTS 2,158,180 A * 5/1939 Goddard .................. 244/79
5,308,024 A * 5/1994 Stetson, Jr. ............ 244/165
(Continued)

FOREIGN PATENT DOCUMENTS

EP 1 632 428 A1 3/2006
EP 1 955 936 A1 8/2008
(Continued)

OTHER PUBLICATIONS

Brown Jr., Benjamin and Xu, Yangsheng. "A Single-Wheel, Gyroscopically Stabilized Robot". Sep. 1997. IEEE Robotics and Automation Magazine. pp. 39-44.*
(Continued)

*Primary Examiner* — John Q Nguyen
*Assistant Examiner* — Michael Ng
(74) *Attorney, Agent, or Firm* — Keating & Bennett, LLP (57) ABSTRACT

In a movement direction control apparatus and a non-transitory computer readable medium, a reaction torque accompanying rotation of a rotor is utilized to control a rotation angle of a body in a yaw direction. A specification of a yaw angle of a wheel as a target of the movement direction is received, and information of a friction torque is acquired. A rotation angular acceleration in the yaw direction is calculated, based on the yaw angle, the specification of which has been received, and the reaction torque is calculated, based on the calculated rotation angular acceleration in the yaw direction. An operation instruction to a motor for yaw is generated, based on the calculated reaction torque and the acquired information of the friction torque.

10 Claims, 9 Drawing Sheets

(56) References Cited

U.S. PATENT DOCUMENTS

| | | | |
|---|---|---|---|
| 5,742,917 A * | 4/1998 | Matsuno | 701/69 |
| 6,367,817 B1 | 4/2002 | Kamen et al. | |
| 6,672,544 B2 * | 1/2004 | McGovern et al. | 244/171 |
| 7,337,862 B1 * | 3/2008 | Greenley et al. | 180/10 |
| 2007/0257451 A1 * | 11/2007 | Furuta et al. | 280/5.501 |
| 2008/0228357 A1 | 9/2008 | Hirata | |
| 2011/0010013 A1 * | 1/2011 | Ruan et al. | 700/261 |
| 2011/0191013 A1 * | 8/2011 | Leeser | 701/124 |
| 2011/0209932 A1 | 9/2011 | Takenaka et al. | |
| 2012/0010783 A1 | 1/2012 | Tsuji et al. | |

FOREIGN PATENT DOCUMENTS

| | | | |
|---|---|---|---|
| EP | 1 977 964 A1 | 10/2008 | |
| JP | 2001-030972 A | 2/2001 | |
| JP | 2003-502002 A | 1/2003 | |
| JP | 2005-335471 A | 12/2005 | |
| JP | 2006-001385 A | 1/2006 | |
| JP | 2007-161198 A | 6/2007 | |
| KR | 10-2008-0059293 A | 6/2008 | |
| WO | 2005/016735 A1 | 2/2005 | |
| WO | 2007/063665 A1 | 6/2007 | |
| WO | 2008/139740 A1 | 11/2008 | |
| WO | 2010106847 A1 | 9/2010 | |

OTHER PUBLICATIONS

Official Communication issued in International Patent Application No. PCT/JP2010/051836, mailed on Apr. 20, 2010.

Kasai, "Attitude Control of Monocycle", Master's Thesis in Graduate School of Systems and Information Engineering, Jan. 2005, pp. 1-37, University of Tsukuba.

Official Communication issued in corresponding European Patent Application No. 10 753 342.4, mailed on Apr. 25, 2013.

Majima et al., "A Controller for Changing the Yaw Direction of an Underactuated Unicycle Robot," 5th International Conference on Technology and Automation, Oct. 15, 2005, pp. 1-6.

Majima et al., "A Design of a Control Method for Changing Yaw Direction of an Underacuatted Unicycle Robot," IEEE, Nov. 14, 2006, 4 pages.

Official Communication issued in corresponding Chinese Patent Application No. 201080012662.0, mailed on Sep. 3, 2014.

* cited by examiner

MOVEMENT DIRECTION CONTROL APPARATUS AND COMPUTER PROGRAM

BACKGROUND OF THE INVENTION

1. Field of the Invention

The present invention relates to a movement direction control apparatus and a computer program enabling even a monocycle to freely veer in a yaw direction.

2. Description of the Related Art

Conventionally, when a monocycle moves, a body swings in a rotation direction with a substantial front-back direction defining an axis (hereinafter, referred to as a roll direction), and in a rotation direction with a substantial right-left direction defining an axis (hereinafter, referred to as a pitch direction), and thus, movements need to be controlled so as to move or stop the body without falling by controlling balance in the roll direction and in the pitch direction. In order to control the balance in the roll direction and in the pitch direction, an inclination of the body needs to be properly detected, and for example, a method of detecting an angular velocity, using an angular velocity sensor and integrating the detected angular velocity to thereby estimate the inclination of the body has been employed (refer to WO2007/063665).

Moreover, the monocycle cannot easily veer by changing an angle of a front wheel as in a two-wheeler, and for example, in many cases, by swinging the body in the roll direction and in the pitch direction, the body is rotated in a rotation direction with a substantially vertical direction of the body defining an axis (hereinafter, referred to as a yaw direction) to change a traveling direction. That is, as disclosed in "Attitude Control of Monocycle" by Takashi Kasai, Master's Thesis in Graduate School of Systems and Information Engineering, University of Tsukuba, January 2005, p. 1-37, by applying sine wave inputs in the roll direction and in the pitch direction to fluctuate phases of both the applied sinewave inputs, a yaw angle change amount is varied, and a yaw angle of a wheel is feedback-controlled so as to perform the veering in a desired movement direction.

However, while in the monocycle disclosed in "Attitude Control of Monocycle" by Takashi Kasai, Master's Thesis in Graduate School of Systems and Information Engineering, University of Tsukuba, January 2005, p. 1-37, the inclination of the body with respect to a gravity direction (vertical direction) is detected by an acceleration sensor, the vertical direction is not necessarily in a balanced state in the roll direction and in the pitch direction. Thus, there is a problem in that when the vertical direction is not in the balanced state, correction for the balanced state is disabled. Also, there is a problem in that a plurality of acceleration sensors are required in addition to a gyrosensor to estimate the inclination of the body, which makes simplification and downsizing of the apparatus difficult.

Moreover, in a two-wheeler, by controlling operation of an actuator that causes a steerable front wheel provided in a front portion of the body to be steered, the veering in a desired movement direction is enabled. However, in a monocycle, there is a problem in that since a steering wheel and a drive wheel are defined by the same wheel and a friction coefficient differs greatly at a time period between during movement and during stopping, it is difficult to specify a rotation moment to be applied to a desired rotation angle.

SUMMARY OF THE INVENTION

To overcome the problems described above, preferred embodiments of the present invention provide a movement direction control apparatus and a computer program enabling a movement direction of a monocycle to be accurately controlled with a simple, convenient configuration.

A movement direction control apparatus according to a preferred embodiment of the present invention preferably includes a wheel that rotates and moves in a front-back direction, and a body that is connected to a rotation shaft of the wheel, and swings in a pitch direction and in a roll direction above the wheel, the body preferably including an angular velocity sensor for yaw arranged to detect a yaw angular velocity, which is a rotation angular velocity in a yaw direction, a rotor with a substantially vertical direction of the body defining a rotation axis, and a motor for yaw arranged to rotate the rotor, wherein a rotation angle in the yaw direction of the body is controlled in accordance with a reaction torque caused by the rotation of the rotor.

A movement direction control apparatus according to another preferred embodiment of the present invention preferably further includes a yaw-angle specification receiving unit that receives a specification of a yaw angle of the wheel as a target of a movement direction, a friction-torque information acquiring unit arranged to acquire information about a friction torque including a magnitude and a direction of the friction torque, a yaw-direction angular acceleration calculating unit arranged to calculate a rotation angular acceleration in the yaw direction, based on the yaw angle the specification of which has been received, a reaction torque calculator arranged to calculate the reaction torque, based on the calculated rotation angular acceleration in the yaw direction, and a motor-for-yaw operation instruction generating unit arranged to generate an operation instruction to the motor for yaw, based on the calculated reaction torque and the acquired information of the friction torque.

The friction-torque information acquiring unit preferably includes a friction torque receiving unit arranged to receive specification of the magnitude and the direction of the friction torque.

The friction-torque information acquiring unit preferably includes a yaw rotation angle detecting unit arranged to detect a rotation angle of the wheel in the yaw direction, a fluctuating torque detector arranged to detect a torque in the yaw direction at a time when the rotation angle in the yaw direction starts fluctuation, and a static-friction torque calculator arranged to calculate a magnitude of a static friction torque, based on the detected torque in the yaw direction, and the calculated static friction torque is acquired as the friction torque.

The friction-torque information acquiring unit preferably includes a convergent torque detector arranged to detect the torque in the yaw direction at a time when the rotation angle in the yaw direction converges, and a dynamic-friction torque calculator arranged to calculate a magnitude of a dynamic friction torque, based on the detected torque in the yaw direction, and the calculated dynamic friction torque is acquired as the friction torque.

According to another preferred embodiment of the present invention, a non-transitory computer readable medium includes a computer program executable in a computer mounted on a movement direction control apparatus, the movement direction control apparatus preferably including a wheel that rotates and moves in a front-back direction, and a body that is connected to a rotation shaft of the wheel, and swings in a pitch direction and in a roll direction above the wheel, the body including an angular velocity sensor for yaw arranged to detect a yaw angular velocity, which is a rotation angular velocity in a yaw direction, a rotor with a substantially vertical direction of the body defining a rotation axis, and a motor for yaw arranged to rotate the rotor, wherein the non-transitory computer readable medium causes the computer to control a rotation angle in the yaw direction of the body in accordance with a reaction torque caused by the rotation of the rotor.

The non-transitory computer readable medium preferably causes the computer to function as a yaw-angle specification receiving unit arranged to receive a specification of a yaw angle of the wheel as a target of a movement direction, a friction-torque information acquiring unit arranged to acquire information of a friction torque including a magnitude and a direction of the friction torque, a yaw-direction angular acceleration calculating unit arranged to calculate a rotation angular acceleration in the yaw direction, based on the yaw angle the specification of which has been received, a reaction torque calculator arranged to calculate the reaction torque, based on the calculated rotation angular acceleration in the yaw direction, and a motor-for-yaw operation instruction generating unit arranged to generate an operation instruction to the motor for yaw, based on the calculated reaction torque and the acquired information of the friction torque.

The non-transitory computer readable medium preferably causes the friction-torque information acquiring unit to function as a friction torque receiver arranged to receive a specification of the magnitude and the direction of the friction torque.

The non-transitory computer readable medium preferably causes the friction-torque information acquiring unit to function as a yaw rotation angle detector arranged to detect a rotation angle of the wheel in the yaw direction, a fluctuating torque detector arranged to detect a torque in the yaw direction at a time when the rotation angle in the yaw direction starts fluctuation, and a static-friction torque calculator arranged to calculate a magnitude of a static friction torque, based on the detected torque in the yaw direction, and an acquiring unit arranged to acquire the calculated static friction torque as the friction torque.

The non-transitory computer readable medium preferably causes the friction-torque information acquiring unit to function as a convergent torque detector arranged to detect the torque in the yaw direction at a time when the rotation angle in the yaw direction converges, and a dynamic-friction torque calculator arranged to calculate a magnitude of a dynamic friction torque, based on the detected torque in the yaw direction, and a unit arranged to acquire the calculated dynamic friction torque as the friction torque.

In the preferred embodiments of the present invention described above, the movement direction control apparatus preferably includes the wheel that rotates and moves in the front-back direction, and the body that is connected to the rotation shaft of the wheel, and swings in the pitch direction and the roll direction above the wheel. The body preferably includes the angular velocity sensor for yaw arranged to detect the yaw angular velocity, which is the rotation angular velocity in the yaw direction, the rotor with the substantially vertical direction of the body defining the rotation axis, and the motor for yaw arranged to rotate the rotor, and the rotation angle in the yaw direction of the body is controlled in accordance with the reaction torque accompanying the rotation of the rotor. This enables a movement direction of a monocycle to be accurately controlled with a simple, convenient constitution.

According to various preferred embodiments of the present invention, the specification of the yaw angle of the wheel as the target of the movement direction is received, and the information of the friction torque including the magnitude and the direction of the friction torque is acquired. The rotation angular acceleration in the yaw direction is calculated, based on the yaw angle the specification of which has been received, and the reaction torque is calculated, based on the calculated rotation angular acceleration in the yaw direction. The operation instruction to the motor for yaw is generated, based on the calculated reaction torque and the acquired information of the friction torque. Thereby, the torque to be generated in the yaw direction of the rotor that generates the reaction torque can be accurately estimated, based on the yaw angle the specification of which has been received, and by controlling a number of rotations and a rotation direction of the motor for yaw that rotates the rotor, corresponding to the yaw angle the specification of which has been received, the movement direction of the body can be veered to a desired movement direction.

Here, the "yaw angle" means an angular difference between a traveling direction of the body and a direction in which the body is veered, when the traveling direction of the body, that is, the current direction of the wheel is used as a reference.

According to various preferred embodiments of the present invention, by receiving the specification of the magnitude and the direction of the friction torque, the rotation angular acceleration in the yaw direction of the rotor that generates the reaction torque in view of the friction torque by the contact between the wheel and the road surface can be estimated, and the number of rotations and the rotation direction of the motor for yaw that rotates the rotor can be more accurately calculated.

According to various preferred embodiments of the present invention, the rotation angle in the yaw direction of the wheel is detected, the torque in the yaw direction at the time when the rotation angle in the yaw direction starts fluctuation is detected, and the magnitude of the static friction torque is calculated, based on the detected torque in the yaw direction. By acquiring the calculated static friction torque as the friction torque, the rotation angular acceleration in the yaw direction of the rotor that generates the reaction torque in view of the static friction torque, which is relatively large at the starting time of the veering, can be estimated.

According to various preferred embodiments of the present invention, the torque in the yaw direction at the time when the rotation angle in the yaw direction converges is detected, and the magnitude of the dynamic friction torque is calculated, based on the detected torque in the yaw direction. By acquiring the calculated dynamic friction torque as the friction torque, the dynamic friction torque occurring at the time of the veering can be found, and the movement direction of the body can be accurately veered to the desired movement direction.

According to various preferred embodiments of the present invention, the torque to be generated in the yaw direction of the rotor that generates the reaction torque can be accurately estimated, based on the yaw angle the specification of which has been received, and by controlling the number of rotations and the rotation direction of the motor for yaw that rotates the rotor, corresponding to the yaw angle the specification of which has been received, the movement direction of the body can be veered to the desired movement direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, referring to the drawings, examples of preferred embodiments of the present invention will be specifically described, in which a movement direction control apparatus according to various preferred embodiments of the present invention is preferably included in a monocycle robot that moves forward and backward without falling by rotation of a wheel, while swinging a body mounted above the wheel.

Figure 1A:
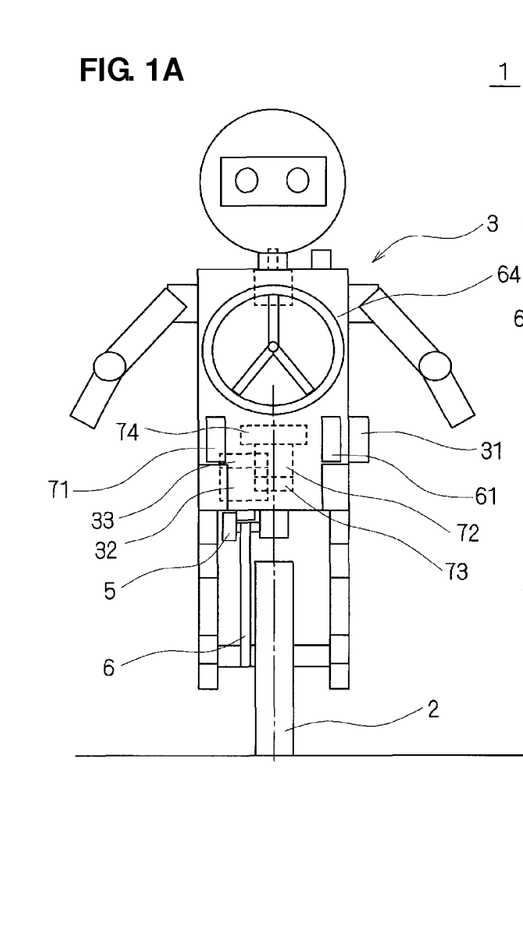
FIGS. 1A and 1B are a front view and a side view schematically showing a monocycle robot including a movement direction control apparatus according to a preferred embodiment of the present invention.
Figure 1B:
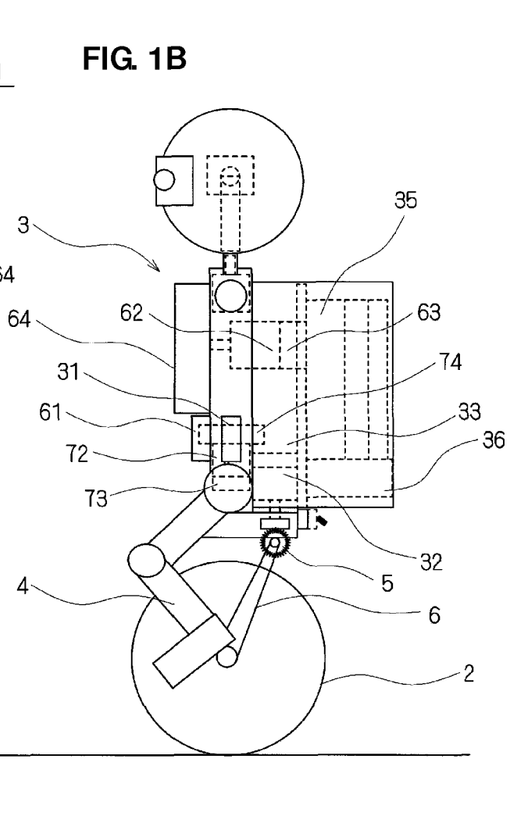

FIGS. 1A and 1B are a front view and a side view schematically showing the monocycle robot including the movement direction control apparatus according to a preferred embodiment of the present invention. FIG. 1A is a front view and FIG. 1B is a left side view. The movement direction control apparatus according to this present preferred embodiment performs control so that a movement direction of a body 3 of a monocycle robot 1 is in a desired direction.

As shown in FIGS. 1A and 1B, the monocycle robot 1 preferably includes a wheel 2 that rotates and moves in a front-back direction, and a body 3 that is connected to a rotation shaft of the wheel 2 and veers in a yaw direction while swinging in a pitch direction and in a roll direction above the wheel 2. While in the example in FIGS. 1A and 1B, the body 3 is preferably a humanoid robot, preferred embodiments of the present invention are not limited thereto.

Figure 2:
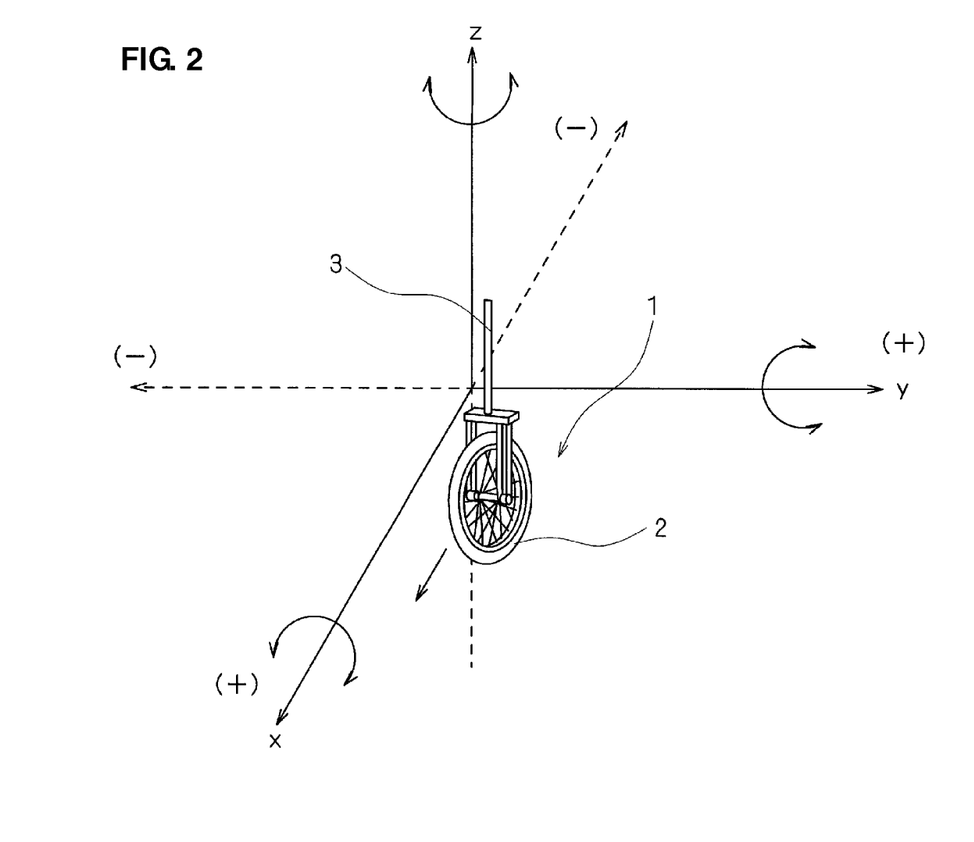
FIG. 2 is a schematic view showing a pitch direction, a roll direction and a yaw direction.

Here, the pitch direction, the roll direction, and the yaw direction are defined. FIG. 2 is a schematic view showing the pitch direction, the roll direction and the yaw direction. As shown in FIG. 2, when the monocycle robot 1 moves so as to advance in a (+) direction of an x axis on an xy surface, or to recede in a (−) direction of the x axis, a rotation direction around a y axis is the pitch direction. When the body 3 rotates counterclockwise when seen from the (+) direction of the Y axis, the body 3 is inclined forward, and when body 3 rotates clockwise when seen from the (+) direction in the y axis, the body 3 is inclined backward. Moreover, a rotation direction around the x axis is the roll direction, which is a rotation direction when the body 3 swings in a right-left direction. Furthermore, a rotation direction around a z axis is the yaw direction, which is a rotation direction when the direction of the wheel 2 is inclined from the x axis direction.

As shown in FIGS. 1A and 1B, the body 3 preferably includes a gyrosensor for pitch (angular velocity sensor for pitch) 31 that detects a pitch angular velocity, which is a rotation angular velocity in the pitch direction, a motor for pitch 32 that links to the rotation of the wheel 2 to rotate the wheel 2, and an encoder for pitch (rotation sensor for pitch) 33 that detects a rotation position or a rotation velocity of the motor for pitch 32. The gyrosensor for pitch 31 is attached to the body 3 so that a detection axis (not shown) to detect the pitch angular velocity is directed in a substantially right-left direction. Here, while the substantially right-left direction means that slight angular deviation from a strict right-left direction (the y axis direction in FIG. 2) is permitted, it is preferable that the detection axis corresponds to the y axis direction. The body 3 and the wheel 2 are connected by frames 4 rotatably supporting the wheel 2, and the rotation by the motor for pitch 32 is transmitted to the wheel 2 through a bevel gear 5 included in body 3 and a belt 6. The frames 4 are a portion of the body 3, and in the example in FIGS. 1A and 1B, the frames 4 are preferably legs of the humanoid robot as the body 3. The angular velocity sensor for pitch only needs to be able to detect the pitch angular velocity, and it is not limited to the gyrosensor described above.

Moreover, in addition to the above-described structure to prevent falling in the pitch direction, the body 3 preferably includes a gyrosensor for roll (angular velocity sensor for roll) 61 that detects a roll angular velocity, which is a rotation angular velocity in the roll direction, an inertia rotor 64 that rotates in the roll direction, a motor for roll 62 that links to rotation of the inertia rotor 64 to rotate the inertial rotor 64, and an encoder for roll (rotation sensor for roll) 63 that detects a rotation position or a rotation velocity of the motor for roll 62. The gyrosensor for roll 61 is attached to the body 3 so that a detection axis (not shown) to detect the roll angular velocity is directed in a substantially front-back direction. Here, while the substantially front-back direction means that slight angular deviation from a strict front-back direction (the x axis direction in FIG. 2) is permitted, it is preferable that the detection axis corresponds to the x axis direction. The angular velocity sensor for roll only needs to be able to detect the roll angular velocity, and it is not limited to the gyrosensor described above.

Furthermore, the body 3 preferably includes a gyrosensor for yaw (angular velocity sensor for yaw) 71 that detects a yaw angular velocity, which is a rotation angular velocity in the yaw direction, an inertial rotor 74 that rotates in the yaw direction, a motor for yaw 72 that links to rotation of the inertia rotor 74 to rotate the inertia rotor 74, and an encoder for yaw (rotation sensor for yaw) 73 that detects a rotation position or a rotation velocity of the motor for yaw 72. The gyrosensor for yaw 71 is attached to the body 3 so that a detection axis (not shown) to detect the yaw angular velocity is directed in a substantially vertical direction. Here, while the substantially vertical direction means that slight angular deviation from a strict vertical direction (the z axis direction in FIG. 2) is permitted, it is preferable that the detection axis corresponds to the z axis direction. The angular velocity sensor for yaw only needs to be able to detect the yaw angular velocity, and it is not limited to the gyrosensor described above.

On a back of the humanoid robot defining the body 3, a control board 35 to control the operations of the motor for pitch 32, the motor for roll 62 and the motor for yaw 72, and a battery 36 are preferably provided. On the control board 35, a driver to drive and rotate the motor for pitch 32, the motor for roll 62 and the motor for yaw 72, and an A/D converter, a D/A converter, a counter, a controller and other suitable components are preferably mounted. The controller is preferably a microprocessor, a CPU, an LSI or other suitable device, for example. Preferably, the monocycle robot 1 is controlled so as to be balanced in the pitch direction, utilizing a reaction torque when the wheel 2 is rotated, and is balanced in the roll direction, utilizing a reaction torque when the inertia rotor 64 is rotated. A rotation angle in the yaw direction is controlled, utilizing a reaction torque when the inertia rotor 74 is rotated.

Figure 3:
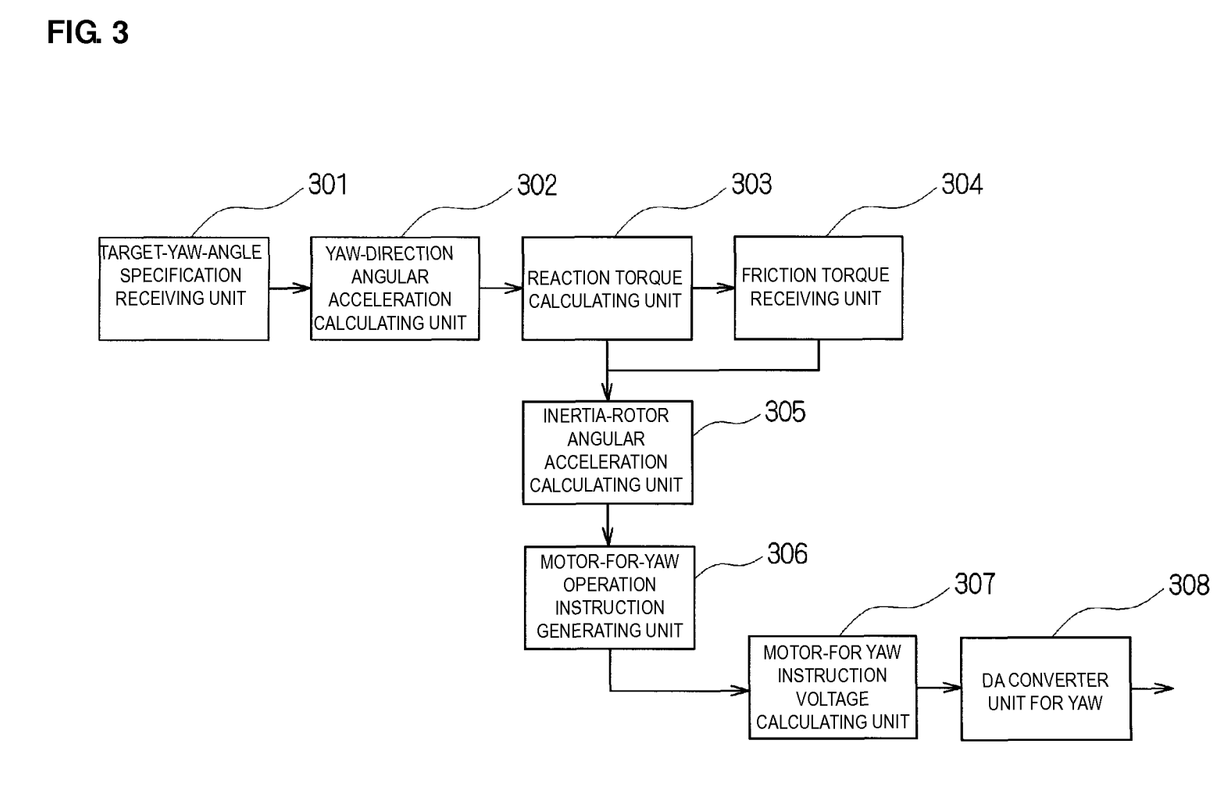
FIG. 3 is a control block diagram showing one example in which a movement direction of the monocycle robot is controlled.

FIG. 3 is a control block diagram showing one example in which the movement direction of the monocycle robot 1 is controlled. Preferably, a target-yaw-angle specification receiving unit 301 receives specification of a target yaw angle $\theta_t$ with a desired movement direction defined as the target yaw angle $\theta_t$. That is, the target yaw angle $\theta_t$ means an angular difference from a traveling direction in which the wheel 2 is currently directed. A method for receiving the specification of the target yaw angle $\theta_t$ is not particularly limited, and the target yaw angle $\theta_t$ to be specified may be received externally through radio communication, such as Bluetooth (registered trademark), or a memory may be incorporated in the controller of the control board 35 to store the target yaw angle $\theta_t$ in the memory in advance. Moreover, a slot into which a memory card, for example, can be inserted may be provided, and the memory card in which the target yaw angle $\theta_t$ is stored may be inserted to read the target yaw angle $\theta_t$ as needed. It is preferable to receive specification of a reaching time t until a yaw angle $\theta$, which is the rotation angle in the yaw direction, reaches the target yaw angle $\theta_t$, for example, specification to the effect that the yaw angle $\theta$ reaches the target yaw angle $\theta_t$ in one second. Given that a yaw angular acceleration $\omega'$, which is a rotation angular acceleration in the yaw direction, is a constant value obtained by performing positive/negative inversion at a midpoint of the reaching time t, variations in a yaw angular velocity $\omega$ and the yaw angle $\theta$ can be approximately calculated more easily (refer to FIG. 7A described later).

A yaw-direction angular acceleration calculating unit 302 preferably calculates the yaw angular velocity $\omega$ by performing time differentiation to the yaw angle $\theta$, based on the target yaw angle $\theta_t$ the specification of which has been received, and the reaching time t until the yaw angle $\theta$ reaches the target yaw angle $\theta_t$. Further, the time differentiation is performed to the calculated yaw angular velocity $\omega$ to calculate the yaw angular acceleration $\omega'$ (rotation angular acceleration in the yaw direction). Given that the yaw angular acceleration $\omega'$ is the constant value obtained by performing the positive/negative inversion at the midpoint of the reaching time t, the yaw angular velocity $\omega$ monotonically increases at a constant rate until half of the reaching time t until the target yaw angle $\theta_t$ is reached has passed, and after half of the reaching time t until the target yaw angle $\theta_t$ is reached has passed, the yaw angular velocity $\omega$ monotonically decreases at a constant rate (refer to FIG. 7B described later).

For example, in the above-described example, the yaw angular acceleration $\omega'$ can be calculated as the positive constant value until half of the reaching time t until the target yaw angle $\theta_t$ is reached has passed, and can be calculated as the negative constant value after half of the reaching time t until the target yaw angle $\theta_t$ is reached has passed, respectively.

A reaction torque calculating unit 303 preferably calculates a rotation torque T2 required to rotate the body 3 to the target yaw angle $\theta_t$, based on the yaw angular acceleration $\omega'$ calculated in the yaw-direction angular acceleration calculating unit 302. The same torque as the rotation torque T2 in the yaw direction of the body 3 is applied as the reaction torque by the rotation of the inertia rotor 74, by which the yaw angle $\theta$ of the body 3 can be controlled (refer to FIG. 7C described later).

Preferably, a friction torque receiving unit 304 receives specification of a friction torque Tr in accordance with a friction coefficient between the wheel 2 and a road surface. The reception of the specification of the friction torque Tr preferably includes specification of at least a magnitude and a direction of the friction torque Tr. Moreover, a method for receiving the specification of the friction torque Tr is not particularly limited, and the magnitude and the direction of the friction torque Tr may be received externally through the radio communication, such as Bluetooth (registered trademark). In place of the friction torque receiving unit 304, the magnitude and the direction of the friction torque Tr may be acquired in the controller of the control board 35 as a friction torque information acquiring unit, or may be stored in the memory in the controller of the control board 35 as constants. Moreover, a slot into which a memory card or other memory device can be inserted may be provided, and the memory card or other memory device in which the magnitude and direction of the friction torque Tr are stored may be inserted to read the friction torque Tr as needed.

Here, unless an extra reaction torque is applied by the friction torque Tr, the body 3 cannot be rotated to the target yaw angle $\theta_t$ the specification of which has been received. Accordingly, a rotation torque T1 to be applied by the rotation of the inertia rotor 74 can be calculated by an expression (1).

$$T1 = T2 + Tr \qquad (1)$$

An inertia-rotor angular acceleration calculating unit 305 calculates a rotation angular acceleration $\omega_R'$ of the inertia rotor 74, based on the rotation torque T1 calculated by the expression (1). That is, if an inertia moment of the inertia rotor 74 is J1, the rotation angular acceleration $\omega_R'$ of the inertia rotor 74 can be calculated by an expression (2).

$$\omega_R' = T1/J1 \qquad (2)$$

A motor-for-yaw operation instruction generating unit 306 integrates, twice, the rotation angular acceleration $\omega_R'$ of the inertia rotor 74 calculated by the expression (2) to thereby calculate a number of rotations (rotation angle) and a rotation direction of the inertia rotor 74, and to generate an operation instruction to the motor for yaw 72 so that the motor for yaw 72 rotates at the calculated number of rotations (rotation angle) and in the calculated rotation direction.

T1 calculated by the expression (1) may be multiplied by a conversion coefficient to thereby calculate the number of rotations (rotation angle) and the rotation direction of the inertia rotor 74 and generate the operation instruction to the motor for yaw 72 so that the motor for yaw 72 rotates at the calculated number of rotations (rotation angle) and in the calculated rotation direction.

A motor-for-yaw instruction voltage calculating unit 307 multiplies the generated operation instruction to the motor for yaw 72 by a conversion coefficient to calculate an instruction voltage. A DA converter unit for yaw 308 outputs the instruction voltage to the driver to control the rotation of the motor for yaw 72.

Figure 4A:
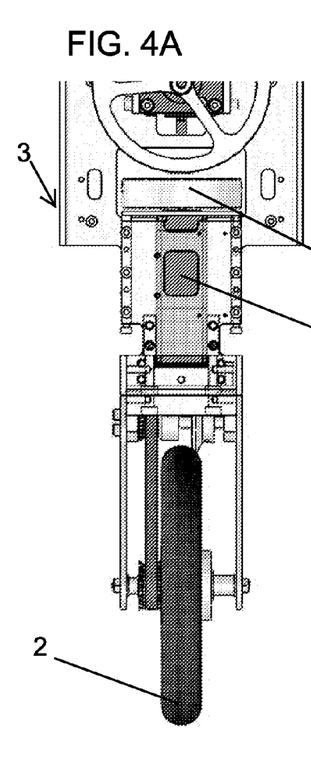
FIGS. 4A and 4B are a front view and a side view schematically showing a lower portion of the monocycle robot including the movement direction control apparatus according to a preferred embodiment of the present invention.
Figure 4B:
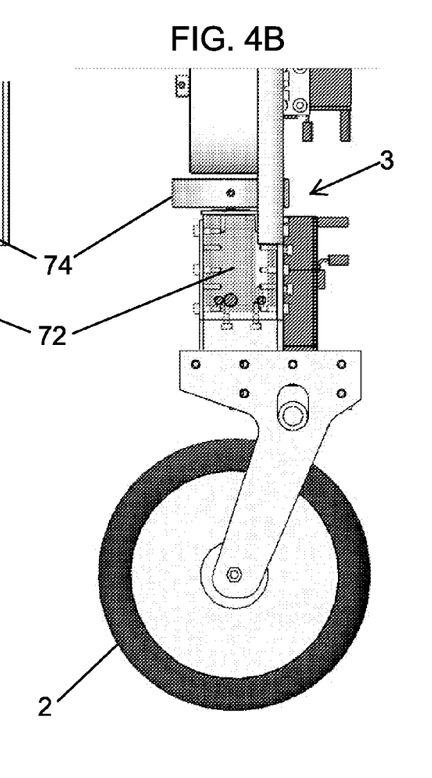

Here, a method for calculating the number of rotations and the rotation direction of the motor for yaw 72, based on the target yaw angle $\theta_t$ the specification of which has been received will be described. FIGS. 4A and 4B are a front view and a side view schematically showing a lower portion of the monocycle robot 1 to which the movement direction control apparatus according to a preferred embodiment of the present invention is applied. FIG. 4A is a front view, and FIG. 4B is a left side view.

In FIGS. 4A and 4B, a central point of the wheel 2 is preferably located on an extension line of a rotation axis of the inertia rotor 74 for yaw direction, and a rotation axis of the motor for yaw 72. Accordingly, the reaction torque by the rotation of the inertia rotor 74 directly acts on veering of the body 3, although it is reduced by the friction torque.

Figure 5A:
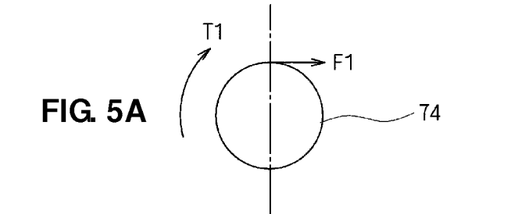
FIGS. 5A to 5C are schematic views showing a rotation torque occurring in an inertia rotor and a body.
Figure 5B:
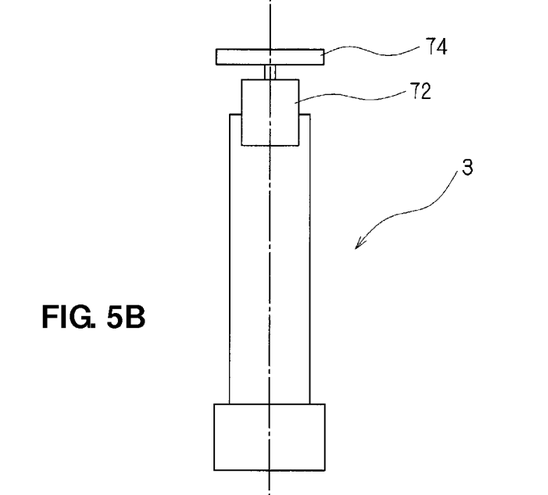
Figure 5C:
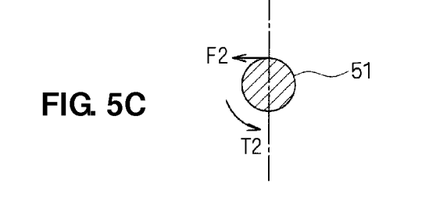

FIGS. 5A to 5C are schematic views explaining the rotation torque occurring in the inertia rotor 74 and the body 3. FIG. 5A is a plan view of the inertia rotor 74, in which the circular flat plate-like inertia rotor 74 is arranged with a central axis of the body 3 defining the rotation axis. A force in a tangential direction of the inertia rotor 74 is F1 (N), the rotation torque is T1, and a radius of the inertia rotor 74 is R1 (m).

FIG. 5B is a schematic view showing a side of the body 3 with the inertia rotor 74 attached. FIG. 5C is a schematic view showing a ground surface at which the wheel 2 connected to the body 3 and the road surface come into contact with each other. In FIG. 5C, given that a ground surface 51 at which the wheel 2 and the road surface come into contact with each other is circular, a force in a tangential direction of the ground surface 51 is F2 (N), the rotation torque is T2, and a radius of the ground surface 51 is R2 (m).

Figure 6A:
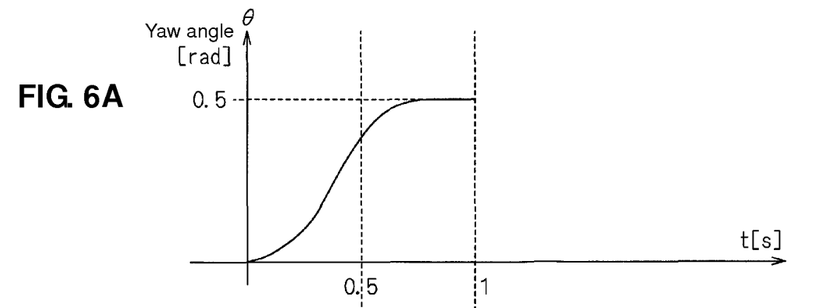
FIGS. 6A to 6C are graphs showing an example for calculating a yaw angular acceleration from a yaw angle.
Figure 6B:
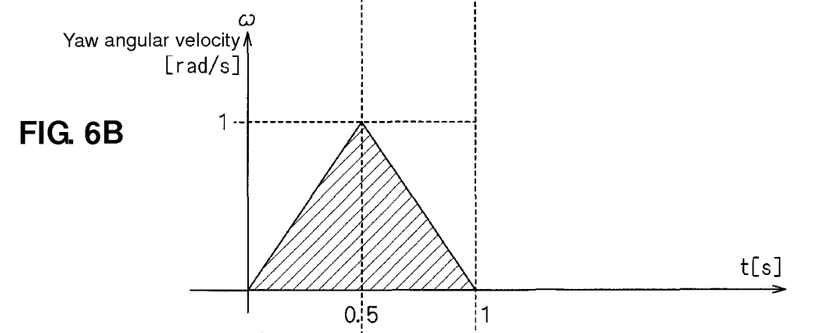
Figure 6C:
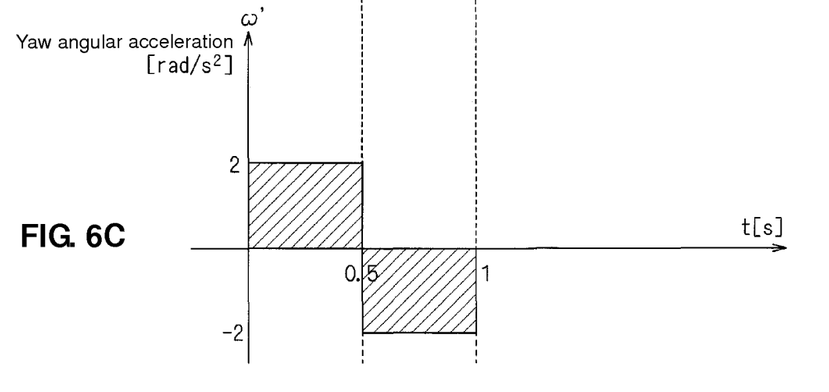

When the specification of the target yaw angle $\theta_t$ is received, the yaw angular velocity $\omega$ is calculated in accordance with the reaching time t until the target yaw angle $\theta_t$ is reached from the current traveling direction, that is, the current traveling direction of the wheel 2. FIGS. 6A to 6C are graphs showing an example for calculating the yaw angular acceleration $\omega'$ from the yaw angle $\theta$. FIG. 6A is a graph showing temporal variation in the yaw angle $\theta$ from the current traveling direction of the wheel 2, in which the target yaw angle $\theta_t$ the specification of which has been received is reached in the reaching time t. The example of FIG. 6A shows a case in which the specification to the effect that the target yaw angle $\theta_t$ is about 30 degrees (about 0.5 rad) and the reaching time t is about 1 second has been received, and the temporal variation in the yaw angle $\theta$ is appropriated so as to obtain the temporal variation in which two quadratic functions are combined after about 0.5 seconds have passed.

FIG. 6B is a graph showing temporal variation in the yaw angular velocity $\omega$ after the rotation torque is applied to the wheel 2, and FIG. 6C is a graph showing temporal variation in the yaw angular acceleration $\omega'$ after the rotation torque is applied to the wheel 2. As shown in FIG. 6B, in the present preferred embodiment, in order that the target yaw angle $\theta_t$=about 0.5 (rad) is reached in the reaching time t=about 1 second, the yaw angular velocity $\omega$ preferably increases to about 1 (rad/s) at the constant yaw angular acceleration $\omega'$ until about 0.5 seconds have passed, and after about 0.5 seconds have passed, the yaw angular velocity $\omega$ decreases to about 0 (rad/s) at the constant yaw angular acceleration $\omega'$, for example.

As shown in FIG. 6C, the yaw angular acceleration $\omega'$ is the value obtained by performing the time differentiation to the yaw angular velocity $\omega$, that is, in the present preferred embodiment, preferably, until about 0.5 seconds have passed, the yaw angular acceleration $\omega'$ is about 2 (rad/s$^2$) as a constant value, and after about 0.5 seconds have passed, the yaw angular acceleration $\omega'$ is about $-2$ (rad/s$^2$) as a constant value, for example.

At a point when the yaw angular acceleration $\omega'$ is determined, the rotation torque T2 in the yaw direction required to rotate the body 3 up to the target yaw angle $\theta_t$ can be calculated with an inertia moment J2 of the body 3. That is, the rotation torque T2 in the yaw direction is calculated by an expression (3).

$$T2 = J2 \times \omega' \quad (3)$$

Here, if a mass m (kg) of the body 3 is about 5 (kg), and the radius R2 (m) of the ground surface 51 where the wheel 2 and the road surface come into contact with each other is about 0.05 (m), then the inertia moment J2 (kgm$^2$) of the body 3 is calculated by an expression (4).

$$J2 = m \times R2^2/2 = 5 \times 0.05 \times 0.05/2 = 6.25 \times 10^{-3} \text{ (kgm}^2\text{)} \quad (4)$$

By substituting the above value into the expression (3), $6.25 \times 10^{-3} \times 2 = 0.0125$ (N·m) is obtained as the rotation torque T2 in the yaw direction required to rotate the body 3 up to about 30 degrees as the target yaw angle $\theta_t$.

When the ground surface 51 at which the wheel 2 and the road surface come into contact with each other is very small and the friction torque Tr has a negligible magnitude, applying the same torque as the rotation torque T2 in the yaw direction of the body 3 as the reaction torque by the rotation of the inertia rotor 74 enables the movement direction of the body 3 to be controlled. The rotation angular acceleration $\omega_R'$ to be applied to the inertia rotor 74 is preferably calculated based on the inertia moment J1 of the inertia rotor 74 and the calculated rotation torque T1.

First, the inertia moment J1 (kgm$^2$) of the inertia rotor 74 can be calculated by an expression (5) with a mass of the inertia rotor 74 defined as M (kg). Here, preferably the mass M (kg) of the inertia rotor 74 is about 0.134 (kg), and the radius R1 (m) of the inertial rotor 74 is about 0.024 (m), for example.

$$J1 = M \times R1^2/2 = 0.134 \times 0.024 \times 0.024/2 = 3.86 \times 10^{-5} \text{ (kgm}^2\text{)} \quad (5)$$

Based on the inertia moment J1 (kgm$^2$) of the inertia rotor 74 and the reaction torque by the rotation of the inertia rotor 74, that is, the rotation torque T1 having the same magnitude as the rotation torque T2 in the yaw direction of the body 3, the rotation angular acceleration $\omega_R'$ of the inertia rotor 74 can be calculated by an expression (6).

$$\omega_R' = T1/J1 = 0.0125 \text{ (N·m)}/3.86 \times 10^{-5} \text{ (kgm}^2\text{)} = 324 \text{ (rad/s}^2\text{)} \quad (6)$$

Figure 7A:
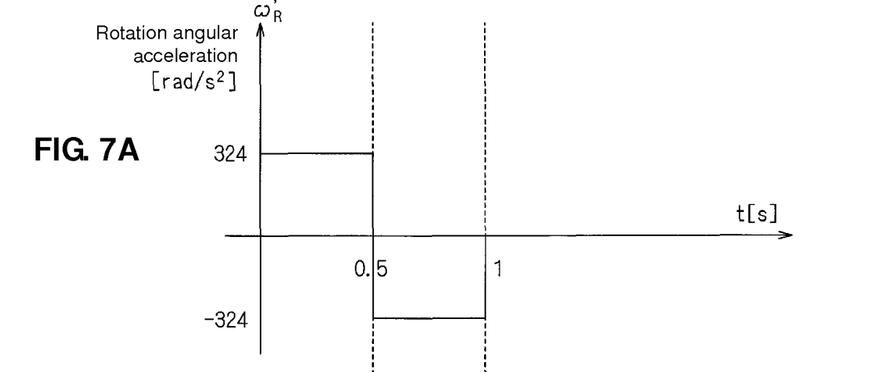
FIGS. 7A to 7C are graphs showing an example in which a rotation angle of the inertia rotor is calculated from a rotation angular acceleration of the inertia rotor.
Figure 7B:
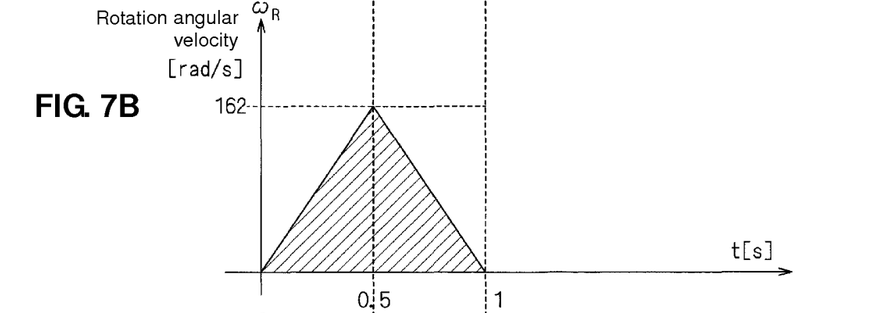
Figure 7C:
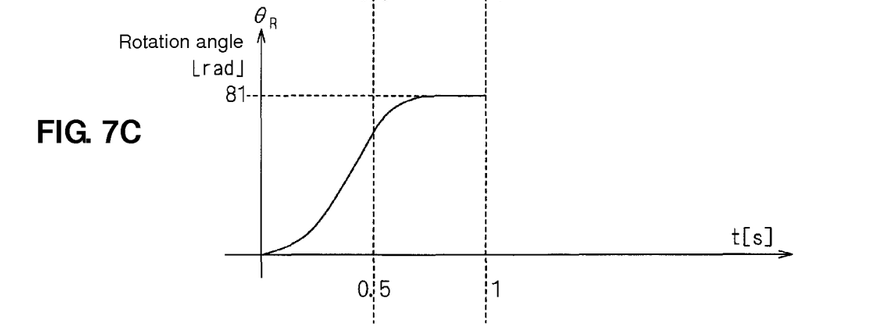

By calculating the rotation angular acceleration $\omega_R'$ of the inertia rotor 74, performing integration twice inversely to the procedure shown in FIGS. 6A to 6B enables a rotation angle $\theta_R$ of the inertia rotor 74 to be determined, and the rotation angular acceleration $\omega_R$ of the inertia rotor 74 to be determined from the rotation angle $\theta_R$ of the inertia rotor 74. FIGS. 7A to 7C are graphs showing an example in which the rotation angle $\theta_R$ of the inertia rotor 74 is calculated from the rotation angular acceleration $\omega_R'$ of the inertia rotor 74.

FIG. 7A is a graph showing temporal variation in the rotation angular acceleration $\omega_R'$ of the inertia rotor 74 until the reaching time t has passed. In the present preferred embodiment, the calculated rotation angular acceleration $\omega_R'$ of the inertia rotor 74 is preferably about 324 (rad/s$^2$) as a constant value until about 0.5 seconds have passed, and is preferably about $-324$ (rad/s$^2$) as a constant value after about 0.5 seconds have passed, for example.

FIG. 7B is a graph showing time variation in rotation angular velocity $\omega_R$ of the inertia rotor 74 until the reaching time t has passed. FIG. 7C is a graph showing time variation in the rotation angle $\theta_R$ of the inertia rotor 74 until the reaching time t has passed. As shown in FIG. 7B, by integrating the calculated rotation angular acceleration $\omega_R'$ of the inertia rotor 74, the rotation angular velocity $\omega_R$ of the inertia rotor 74 preferably increases to about 162 (rad/s) at the constant rotation angular acceleration $\omega_R'$ until about 0.5 seconds have passed, and the rotation angular velocity $\omega_R$ preferably decreases to about 0 (rad/s) at the constant rotation angular acceleration $\omega_R'$ after about 0.5 seconds have passed, for example.

Accordingly, the inertia rotor 74 is preferably rotated at about 25.8 rotations per second, that is, at about 1547 rotations per minute so that the rotation angular velocity $\omega_R$ is about 162 (rad/s), for example, by which the desired reaction torque can be applied to the body 3.

Furthermore, as shown in FIG. 7C, the constant rotation angle $\theta_R$ of the inertia rotor 74 is preferably converged on about 81 (rad) in the reaching time t=about 1 second by integrating the calculated rotation angular velocity $\omega_R$ of the inertia rotor 74. Accordingly, the inertia rotor 74 preferably rotates so that the rotation angle $\theta_R$ becomes about 81 (rad), that is, rotates up to about 4640 degrees for the reaching time t=about 1 second, for example. Thus, the inertia rotor 74 preferably rotates at about 12.9 rotations for one second, for example, which allows the body 3 to veer at the target yaw angle $\theta_t$ the specification of which has been received.

Actually, the magnitude of the friction torque Tr based on a velocity friction coefficient $\mu$ in the ground surface 51 is not negligible, and the body 3 cannot be rotated up to the target yaw angle $\theta_t$ the specification of which has been received, unless an extra reaction torque, which corresponds to the friction torque Tr, is applied.

If a gravitational acceleration g is about 9.8 (m/s²), the friction torque Tr can be calculated by an expression (7).

$$Tr=\mu \cdot m \cdot g \cdot R2 \tag{7}$$

Accordingly, the rotation torque T1 to be applied by the rotation of the inertia rotor 74 is preferably (T2+Tr) as expressed in the expression (1).

Figure 8A:
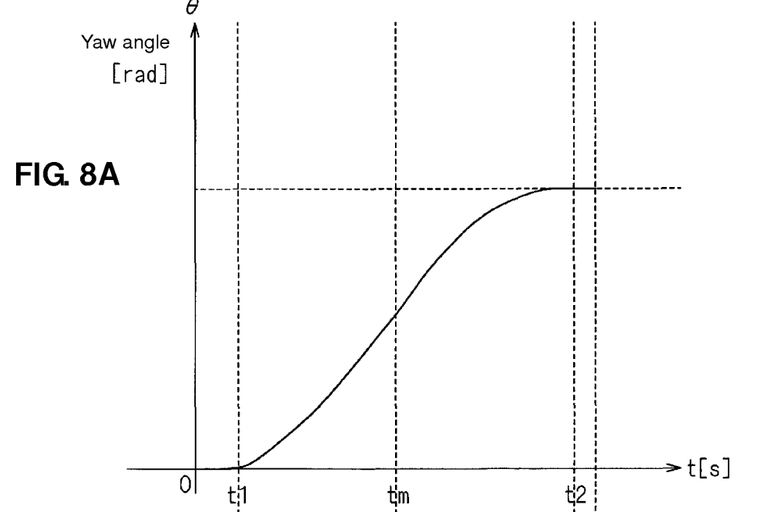
FIGS. 8A and 8B are graphs explaining a method for specifying a friction torque.
Figure 8B:
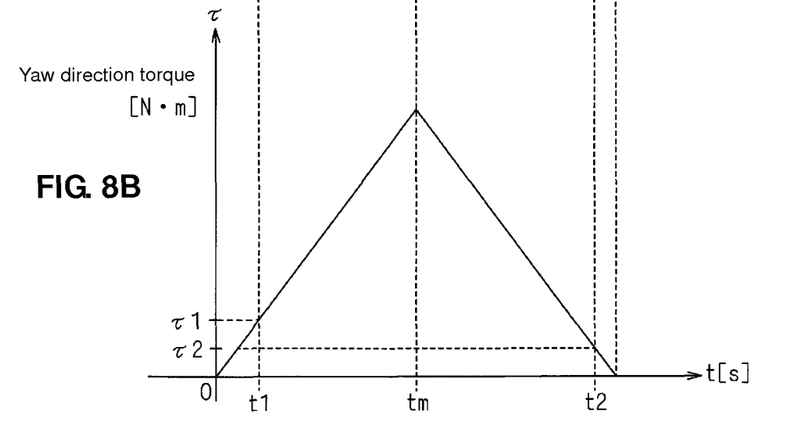

The magnitude of the friction torque Tr fluctuates, depending on the velocity friction coefficient $\mu$ on the ground surface 51 at which the wheel 2 and the road surface come into contact with each other. FIGS. 8A and 8B are graphs explaining a method for specifying the friction torque Tr. FIG. 8A is a graph showing actual time variation in the yaw angle $\theta$ (rad) from the rotation start of the inertia rotor 74, and FIG. 8B is a graph showing time variation in a torque $\tau$ (N·m) in the yaw direction from the rotation start of the inertia rotor 74.

As shown in FIG. 8B, the torque $\tau$ (N·m) in the yaw direction increases at a constant rate from the rotation start of the inertia rotor 74, while as shown in FIG. 8A, the yaw angle $\theta$ does not fluctuate until time t1 corresponding a certain time after the rotation start of the inertia rotor 74. This is because the rotation does not start until the friction torque Tr on the ground surface 51 exceeds a friction torque based on a static friction, and at a point when the friction torque Tr exceeds the friction torque based on the static friction, that is, at the time t1, the body 3 starts the rotation in the yaw direction.

Accordingly, a rotation torque corresponding to the torque $\tau 1$ (N·m) in the yaw direction at the time t1 can be referred to as a static friction torque. Thus, when the rotation torque corresponding to the torque $\tau 1$ (N·m) in the yaw direction is specified as the friction torque Tr, the high-accuracy control for the target yaw angle $\theta_t$ the specification of which has been received is enabled.

On the other hand, once the body 3 starts to rotate in the yaw direction, the velocity friction coefficient $\mu$ greatly decreases. Accordingly, when the rotation torque corresponding to the torque $\tau$ (N·m) in the yaw direction is specified as the friction torque Tr, the applied reaction torque is likely to be excessive. Accordingly, a dynamic friction torque in the state in which the body 3 is rotating in the yaw direction may be specified as the friction torque Tr.

In this case, as shown in FIG. 8A, after an intermediate time tm of the reaching time t has passed since the inertia rotor 74 has started the rotation, the yaw angle $\theta$ converges on the target yaw angle $\theta_t$ at a time t2. This is because the friction torque on the ground surface 51 has achieved a balance with the reaction torque by the inertia rotor 74. Accordingly, as shown in FIG. 8B, a rotation torque corresponding to a torque $\tau 2$ (N·m) in the yaw direction at the time t2 is referred to as the dynamic friction torque. Thus, when the rotation torque corresponding to the torque $\tau 2$ (N·m) in the yaw direction is specified as the friction torque Tr, the higher-accuracy control for the target yaw angle $\theta_t$ the specification of which has been received is enabled.

Figure 9:
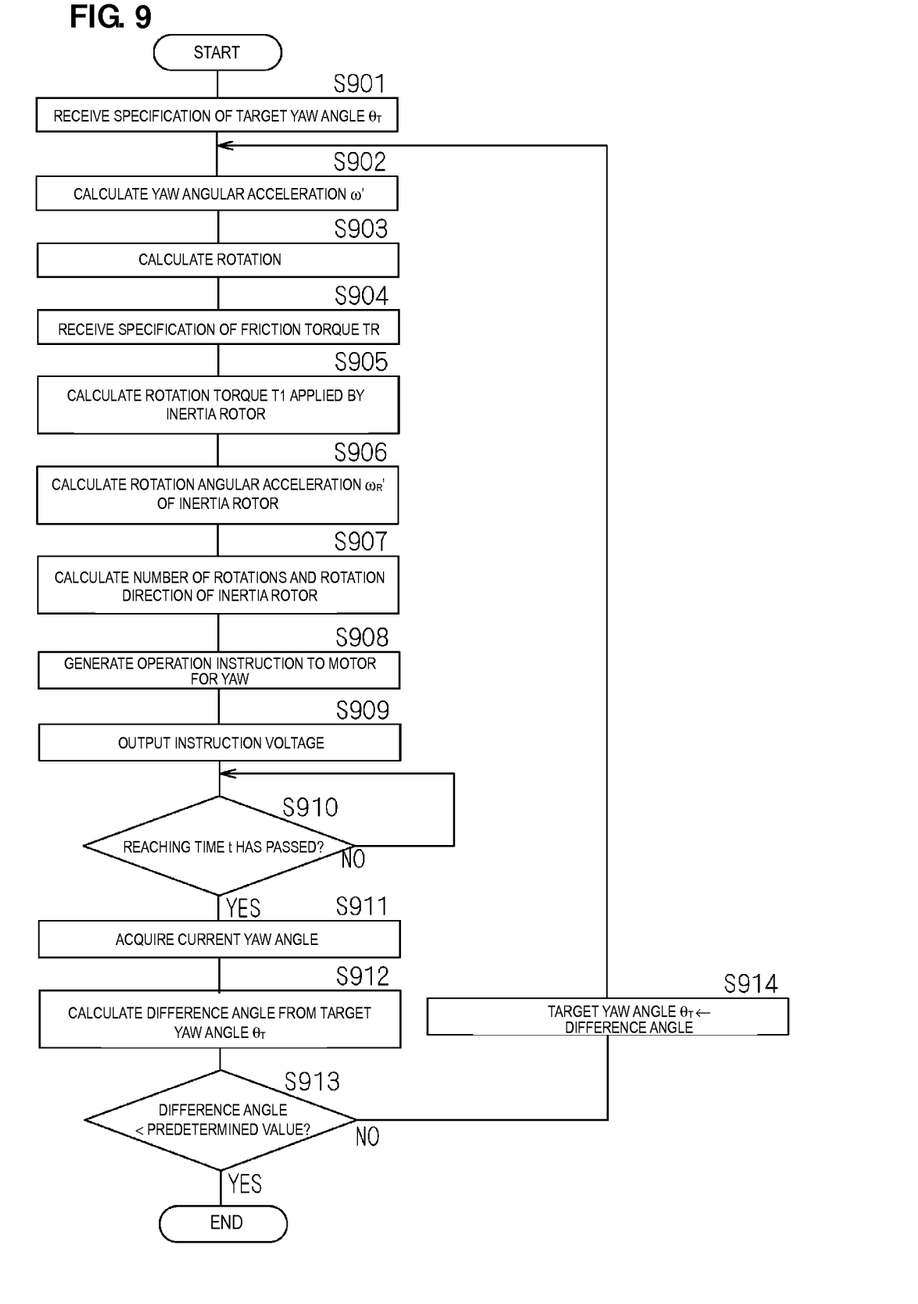
FIG. 9 is a flowchart showing veering processing by a controller of a control board of the movement direction control apparatus according to a preferred embodiment of the present invention.

FIG. 9 is a flowchart showing veering processing by the controller of the control board 35 of the movement direction control apparatus according to a preferred embodiment of the present invention. The controller of the control board 35 receives the specification of the target yaw angle $\theta_t$ (step S901). The method for receiving the specification of the target yaw angle $\theta_t$ is not particularly limited, and the target yaw angle $\theta_t$ to be specified may be received externally through the radio communication, such as Bluetooth (registered trademark), or the memory may be incorporated in the controller of the control board 35 to store the target yaw angle $\theta_t$ in the memory in advance. Moreover, the slot into which the memory card or other memory device can be inserted may be provided, and the memory card or other memory device in which the target yaw angle $\theta_t$ is stored may be inserted to read the target yaw angle $\theta_t$ as needed. The reaching time t until the yaw angle $\theta$, which is a rotation angle in the yaw direction, reaches the target yaw angle $\theta_t$ may be received simultaneously with the reception of the specification of the target yaw angle $\theta_t$, or may be stored in the memory of the controller as a constant time in advance.

The controller calculates the yaw angular acceleration $\omega'$ by performing, twice, the time differentiation to the target yaw angle $\theta_t$ the specification of which has been received (step S902). Given that the yaw angular acceleration $\omega'$ is the constant value obtained by performing the positive/negative inversion at the midpoint of the reaching time t, the yaw angular velocity $\omega$ monotonically increases at the constant rate until half of the reaching time t until the target yaw angle $\theta_t$ is reached has passed, and after half of the reaching time until the target yaw angle $\theta_t$ is reached has passed, the yaw angular velocity $\omega$ monotonically decreases at the constant rate.

The yaw angular acceleration $\omega'$ can be calculated by performing the time differential to the assumed yaw angular velocity $\omega$. In the above-described example, the yaw angular acceleration $\omega'$ can preferably be calculated as a positive constant value until half of the reaching time t until the target yaw angle $\theta_t$ is reached has passed, and can be calculated as a negative constant value after half of the reaching time t until the target yaw angle $\theta_t$ is reached has passed, respectively.

The controller calculates the rotation torque T2 required for rotating the body 3 up to the target yaw angle $\theta_t$, based on the calculated yaw angular acceleration $\omega'$ (step S903). The controller receives the specification of the friction torque Tr in accordance with the velocity friction coefficient $\mu$ between the wheel 2 and the road surface (step S904). The controller adds the calculated rotation torque T2 and the friction torque Tr the specification of which has been received to calculate the rotation torque T1 to be applied by the rotation of the inertia rotor 74 (step S905).

The controller calculates the rotation angular acceleration $\omega_R'$ of the inertia rotor 74, based on the calculated rotation torque T1 (step S906), and by integrating the calculated rotation angular acceleration $\omega_R'$ of the inertia rotor 74 twice, the number of rotations (rotation angle) and the rotation direction of the inertia rotor 74 are calculated (step S907), the operation instruction to the motor for yaw 72 is generated so as to rotate the motor for yaw 72 at the calculated number of rotations (rotation angle) and the calculated rotation direction (step S908). In steps S906 to S908, by multiplying the rotation torque T1 calculated in step S905 by the conversion coefficient, the number of rotations (rotation angle) and the rotation direction of the inertia rotor 74 may be calculated, and the operation instruction to the motor for yaw 72 may be generated so as to rotate the motor for yaw 72 at the calculated number of rotations (rotation angle) and the calculated rotation direction. The controller multiplies the generated operation instruction to the motor for yaw 72 by the conversion coefficient to calculate the instruction voltage and output the instruction voltage to the driver (step S909).

The controller determines whether or not the reaching time t has passed (step S910), and if the controller determines that the reaching time t has not passed (step S910: NO), the controller enters a passing-waiting state. If the controller determines that the reaching time t has passed (step S910: YES), the controller acquires the current yaw angle (step S911), and calculates the difference angle from the target yaw angle $\theta_t$ (step S912).

The controller determines whether or not the calculated difference angle is less than a predetermined value (step S913), and if the controller determines that the difference angle is the predetermined value or greater (step S913: NO), the controller sets the calculated difference angle to the new target yaw angle $\theta_t$ (step S914), and returns the processing to step S902 to repeat the above-described processing. If the controller determines that the calculated angle is less than the predetermine value (step S913: YES), the controller determines that the veering has been completed, and ends the processing.

As described above, according to the present preferred embodiment, based on the target yaw angle $\theta_t$, the specification of which has been received, the rotation angular acceleration $\omega_R'$ to be generated in the yaw direction of the inertia rotor 74 that generates the reaction torque can be accurately estimated, and controlling the number of rotations and the rotation direction of the motor for yaw 72 that rotates the inertia rotor 74 enables the body 3 to be veered in the desired movement direction.

The above-described preferred embodiment can be modified in a range not departing from the scope of the present invention. For example, preferred embodiments of the present invention are not limited to the specification of the static friction torque based on the static friction coefficient, and the dynamic friction torque based on the dynamic friction coefficient as the friction torque, and, for example, the specification of the friction torque may be variable, so that the static friction torque may be specified until the time t1, and the dynamic friction torque may be specified after the time t1 has passed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A movement direction control apparatus comprising:
    a wheel arranged to rotate and move in a front-back direction and including a rotation shaft; and
    a body connected to the rotation shaft of the wheel, an entirety of the body is arranged to swing in a pitch direction and in a roll direction above the wheel; wherein the body comprises:
        an angular velocity sensor arranged to detect a yaw angular velocity of the body, which is a rotation angular velocity in a yaw direction;
        a rotor within the body having a rotation axis defined by a substantially vertical direction of the body; and
        a motor arranged to rotate the rotor; wherein
    a rotation angle of the body in the yaw direction is controlled in accordance with a reaction torque of the body caused by rotation of the rotor.

2. The movement direction control apparatus according to claim 1, further comprising:
    a yaw-angle specification receiving unit arranged to receive a specification of a yaw angle of the wheel as a target of a movement direction;
    a friction-torque information acquiring unit arranged to acquire information about a friction torque of the wheel including a magnitude and a direction of the friction torque;
    a yaw-direction angular acceleration calculating unit arranged to calculate a rotation angular acceleration in the yaw direction, based on the yaw angle the specification of which has been received;
    a reaction torque calculator arranged to calculate the reaction torque, based on the calculated rotation angular acceleration in the yaw direction; and
    a motor-for-yaw operation instruction generating unit arranged to generate an operation instruction to the motor for yaw, based on the calculated reaction torque and the acquired information of the friction torque.

3. The movement direction control apparatus according to claim 2, wherein the friction-torque information acquiring unit comprises a friction torque receiver arranged to receive specification of the magnitude and the direction of the friction torque.

4. The movement direction control apparatus according to claim 2, wherein
    the friction-torque information acquiring unit comprises:
        a yaw rotation angle detector arranged to detect a rotation angle of the wheel in the yaw direction;
        a fluctuating torque detector arranged to detect a torque of the body in the yaw direction at a time when the rotation angle in the yaw direction starts fluctuation; and
        a static-friction torque calculator arranged to calculate a magnitude of a static friction torque of the wheel, based on the detected torque in the yaw direction; and
    the calculated static friction torque is acquired as the friction torque.

5. The movement direction control apparatus according to claim 2, wherein
    the friction-torque information acquiring unit comprises:
        a convergent torque detector arranged to detect the torque of the body in the yaw direction at a time when the rotation angle in the yaw direction converges; and
        a dynamic-friction torque calculator arranged to calculate a magnitude of a dynamic friction torque of the wheel, based on the detected torque in the yaw direction; and
    the calculated dynamic friction torque is acquired as the friction torque.

6. A non-transitory computer readable medium including a computer program executable in a computer mounted on a movement direction control apparatus, the movement direction control apparatus including a wheel arranged to rotate and move in a front-back direction, the wheel including a rotation shaft, and a body connected to the rotation shaft of the wheel, an entirety of the body is arranged to swing in a pitch direction and in a roll direction above the wheel;

the body comprising:
- an angular velocity sensor arranged to detect a yaw angular velocity of the body, which is a rotation angular velocity in a yaw direction;
- a rotor within the body having a rotation axis defined by a substantially vertical direction of the body; and
- a motor arranged to rotate the rotor; wherein the non-transitory computer readable medium causes the computer to function as a unit arranged to control a rotation angle of the body in the yaw direction in accordance with a reaction torque of the body accompanying the rotation of the rotor.

7. The non-transitory computer readable medium according to claim 6, wherein the non-transitory computer readable medium causes the computer to function as:
- a yaw-angle specification receiving unit arranged to receive a specification of a yaw angle of the wheel as a target of a movement direction;
- a friction-torque information acquiring unit arranged to acquire information about a friction torque of the wheel including a magnitude and a direction of the friction torque;
- a yaw-direction angular acceleration calculating unit arranged to calculate a rotation angular acceleration in the yaw direction, based on the yaw angle the specification of which has been received;
- a reaction torque calculator arranged to calculate the reaction torque, based on the calculated rotation angular acceleration in the yaw direction; and
- a motor-for-yaw operation instruction generating unit arranged to generate an operation instruction to the motor for yaw, based on the calculated reaction torque and the acquired information of the friction torque.

8. The non-transitory computer readable medium according to claim 7, wherein the non-transitory computer readable medium causes the friction-torque information acquiring unit to function as a friction torque receiver arranged to receive a specification of the magnitude and the direction of the friction torque.

9. The non-transitory computer readable medium according to claim 7; wherein the non-transitory computer readable medium causes the friction-torque information acquiring unit to function as:
- a yaw rotation angle detector arranged to detect a rotation angle of the wheel in the yaw direction;
- a fluctuating torque detector arranged to detect a torque of the body in the yaw direction at a time when the rotation angle in the yaw direction starts fluctuation;
- a static-friction torque calculator arranged to calculate a magnitude of a static friction torque of the wheel, based on the detected torque in the yaw direction; and
- a unit arranged to acquire the calculated static friction torque as the friction torque.

10. The non-transitory computer readable medium according to claim 7, wherein the non-transitory computer readable medium causes the friction-torque information acquiring unit to function as:
- a convergent torque detector arranged to detect the torque of the body in the yaw direction at a time when the rotation angle in the yaw direction converges;
- a dynamic-friction torque calculator arranged to calculate a magnitude of a dynamic friction torque of the wheel, based on the detected torque in the yaw direction; and
- a unit arranged to acquire the calculated dynamic friction torque as the friction torque.

* * * * *